United States Patent [19]
Bursztejn et al.

[11] Patent Number: 4,562,307
[45] Date of Patent: Dec. 31, 1985

[54] TRANSMITTER-RECEIVER STATION HAVING LOW POWER CONSUMPTION FOR A TWO-WAY COMMUNICATION LINK

[75] Inventors: Jacques Bursztejn, Paris; Lucien Babany, Le Blanc Mesnil, both of France

[73] Assignee: Thomson-CSF, Paris, France

[21] Appl. No.: 640,195

[22] Filed: Aug. 13, 1984

[30] Foreign Application Priority Data

Aug. 17, 1983 [FR] France .................. 83 13394

[51] Int. Cl.[4] .................. H04Q 7/04; H04B 1/16
[52] U.S. Cl. .................. 179/2 E; 179/2 EB; 455/343
[58] Field of Search ........... 179/2 E, 2 EA, 2 EB, 179/2.51, 2 EC; 455/127, 343, 227-229, 231, 88, 68-70

[56] References Cited

U.S. PATENT DOCUMENTS 2,912,574  11/1959  Gensel .................. 250/20
4,449,248  5/1984   Leslie et al. .......... 455/343 X
4,467,141  8/1984   Resch et al. .......... 179/2 EA

FOREIGN PATENT DOCUMENTS 2209134  3/1973  Fed. Rep. of Germany .
3201538  7/1983  Fed. Rep. of Germany .

OTHER PUBLICATIONS

Patents Abstracts of Japan, vol. 5, No. 181 (E83) (853), Nov. 20, 1981 & JP A 56 110 357 (Nippon Denshin) (01-09-1981).

Patents Abstracts of Japan, vol. 6, No. 5 (E100) (930), Apr. 7, 1982 & JP A 56 165 425 (Meisei Denki K.K.) (19-12-81).

Primary Examiner—Gene Z. Rubinson
Assistant Examiner—W. J. Brady
Attorney, Agent, or Firm—Pollock, VandeSande & Priddy

[57] ABSTRACT

A transmitter-receiver station for two-way communication links comprises a power-saving device and a ringer which is responsive to incoming calls. When the handset of the station considered is replaced in its cradle after a connection with another station, the power-saving device of the station considered comes into operation, with the immediate result that the transmitter-receiver unit is subsequently supplied only in an intermittent manner and that, by means of a delay circuit, the ringer of the telephone set can be actuated only after a predetermined time interval. The effect thereby achieved in the station considered is that operation of the ringer is prevented from taking place as soon as the handset has been replaced if the handset in the other station remains lifted for a slightly longer period of time.

3 Claims, 2 Drawing Figures

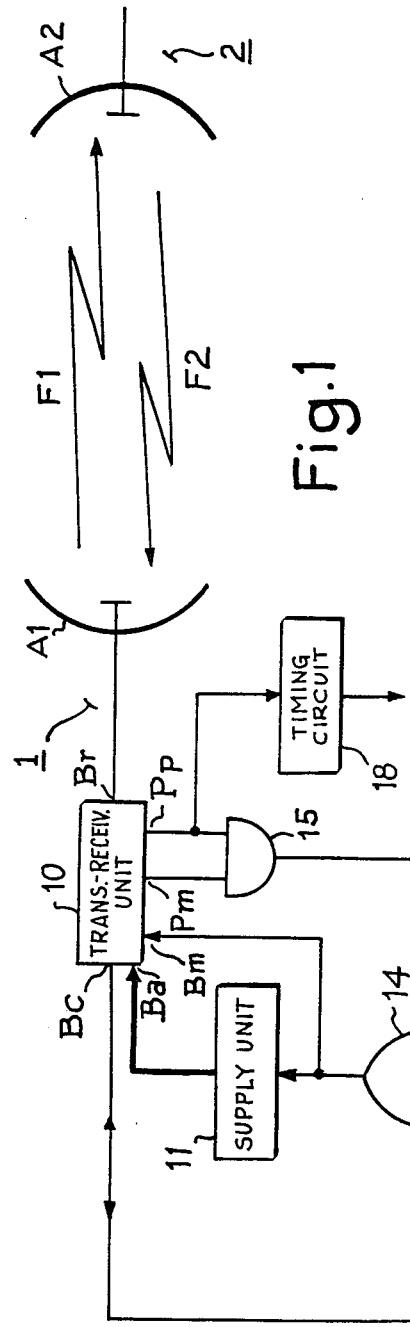
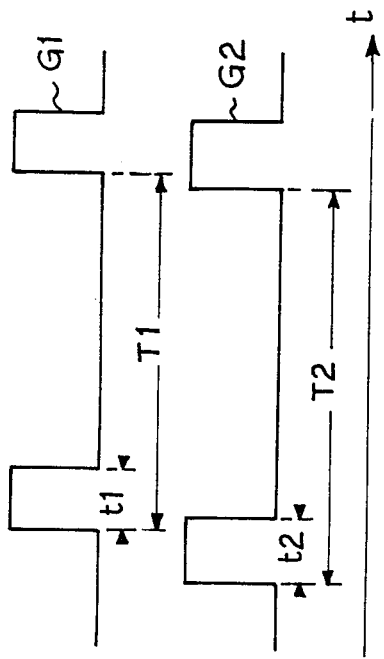

TRANSMITTER-RECEIVER STATION HAVING LOW POWER CONSUMPTION FOR A TWO-WAY COMMUNICATION LINK

BACKGROUND OF THE INVENTION

1. Field of the Invention

The present invention relates to the field of transmitter-receiver telephone stations which are intended to be employed in two-way communication links without any intermediate management unit such as an exchange and which are in a standby-watch state over more or less long periods of time or, in other words, which await subsequent reception of a signal and, during these watch periods, are supplied intermittently in order to save power. The present invention is more particularly concerned with the control of means for saving power.

2. Description of the Prior Art

It is already a known practice to supply a station intermittently as long as it is in the standby-watch state. For technological reasons, it is preferable to have supply periods of relatively substantial length (at least of the order of one second) in the standby-watch state and consequently to have "non-supply" periods which are also of long duration (of the order of at least five seconds). These stations must be capable of calling each other. In order to achieve this aim, it is known to utilize the presence of a modulating signal in the signal received by the called station in order to operate a bell circuit or so-called ringer. However, this gives rise to disadvantages at the moment of completion of a conversation. Unless the users of the two connected telephone sets hang-up simultaneously, the bell circuit of the station which has "rung-off" first is closed as long as the other station has not rung-off.

SUMMARY OF THE INVENTION

The aim of this invention is to overcome the above-mentioned disadvantage by making it possible for the first station which has rung-off :
- not to be called again immediately even if the second station has not rung-off,
- to undergo an immediate transition to a power-saving condition,
- to be capable of resuming a communication after a period of shorter duration than the "non-supply" periods if the handset of the second station remains lifted or in other words if the user of the second station desires to continue a conversation.

This result is obtained by means of suitable control of the ringer and of the power-saving device.

According to the present invention, there is provided a transmitter-receiver station for a two-way communication link, comprising a transmitter-receiver unit, means for supplying current to said transmitter-receiver unit, a telephone handset to be lifted from its cradle in order to be put into service, and a telephone set which is provided with a ringer and delivers a "lifted-handset" signal when the handset is removed from its cradle. The station is equipped with a power-saving device comprising a frequency generator for producing pulses and a coupling circuit which has the function during a standby-watch state of the station of controlling the operation of the current supply means in dependence on the duration of the pulses and of permitting continuous operation of said current supply means throughout the duration of the lifted-handset signal. The coupling circuit comprises a delay circuit for receiving the lifted-handset signal, for preventing operation of the ringer and for preventing continuous operation of the current supply means during a predetermined time interval after disappearance of the lifted-handset signal.

BRIEF DESCRIPTION OF THE DRAWING

Other features of the invention will be more apparent upon consideration of the following description and accompanying drawing, wherein :

FIG. 1 is a diagram of a radio-link system showing a transmitter-receiver station equipped with a power-saving device in accordance with the invention ;

FIG. 2 is a waveform diagram of the signals employed in stations of the type shown in FIG. 1.

DETAILED DESCRIPTION OF THE INVENTION

FIG. 1 shows two transmitter-receiver stations 1, 2 between which information can be exchanged by radio communication. The station 2 in which only the antenna A2 is shown transmits at a carrier frequency $F2 = 31.185$ GHz. The station 1 transmits at a frequency $F1 = 31.025$ GHz.

As shown in FIG. 1, the station 1 comprises a transmitter-receiver unit 10 together with its supply unit 11 and its telephone set 12. The transmitter-receiver unit 10 provides the following different simple or multiple accesses :

access Bc connected to the telephone set for transmitting information received by the station to the telephone set and for receiving information to be transmitted by the station and originating from the telephone set, access Ba connected to the supply for receiving the different supply voltages required for good performance of the transmitter-receiver unit, access Br connected to an antenna A1 for transmission and reception of signals by radio communication, access Bm for receiving a signal having a "1" logic level in order to permit operation of the circuit for modulating the transmitter-receiver unit 10 and having a "0" logic level when this is not the case, access Pp for delivering a signal having a "1" logic level when the transxitter-receiver unit receives a signal at the frequency F2 from the antenna A1, that is to say at the frequency of the carrier wave of station 2 and having a "0" logic level when this is not the case, access Pm for delivering a signal having a "1" logic level when the signal received at the frequency F2 is mcdulated by information, that is, for delivering a signal having a "1" logic level when the presence of modulation is detected in the received signal and for delivering a signal having a "0" logic level when this is not the case.

The supply unit 11 has an on-off control input and, depending on whether it receives a logical "1" or "0" signal on said input, either delivers or does not deliver supply voltages to the unit 10.

The telephone set 12 has an output for delivering a signal D or so-called "lifted-handset" signal which has the "1" logic level when the handset consisting of microphone and receiver is lifted from the cradle of the telephone set and is in readiness for use. The signal D has the "0" logic level whenever the handset is not lifted from its cradle. The unit known as a telephone set 12 also has an input E for receiving a call signal and operating a bell circuit or ringer within the telephone set. Said ringer is represented by a dashed-line circle in FIG. 1. Operation of the ringer is discontinued as soon as the handset is lifted. In a customary use of the transmitter-receiver unit 10, the supply unit 11 is in continuous operation or, in other words, the supply voltages are continuously delivered to the access Ba. In order to reduce the power consumption resulting from this continuous connection, the station of FIG. 1 comprises a power-saving device formed by circuits which are designated by the reference numerals 13 to 18.

The power-saving device is intended to permit only periodic supply of the transmitter-receiver unit 10 during standby-watch periods or in other words, in the example described, during time intervals in which the handset of the telephone unit 12 is not lifted and in which the station 1 is not receiving information from the station 2. During these standby-watch periods, the signal D and the signal which indicates the presence of received modulation and is delivered by the access Pm are at the "0" logic level and station 1 must be capable of changing-over to continuous operation if station 2 is in the transmitting condition.

In order to supply the transmitter-receiver unit 10 periodically during a standby-watch period, the power-saving device comprises a frequency generator 13 which delivers a signal G1 via an OR-gate 14 to the on-off control input of the supply unit 11, the representative curve of said signal G1 as a function of the time interval t being given in FIG. 2. Said signal G1 is formed by periodic pulses having a time-duration T1 equal to six seconds and a time-duration $t_1 = 1$ second. In the standby-watch state, the operation of the supply unit 11 will be limited to the pulse duration or in other words the transmitter-receiver unit 10 will be supplied only during one-sixth of the time interval.

The output signal of the OR-gate 14 is also applied to the modulation-permission access Bm of the transmitter-receiver unit 10.

When the antenna A1 receives a modulated signal having a carrier frequency F2 during a standby-watch period, the transmitter-receiver unit 10 detects said modulated signal as soon as it is supplied with current, that is to say as soon as a period t1 begins (as shown in FIG. 2). The signals delivered by the accesses Pp and Pm are therefore at the "1" logic value since the receiving portion of the unit 10 has detected a carrier wave and since said carrier wave is modulated. An AND-gate 15 having two inputs connected respectively to the accesses Pp and Pm therefore has an output which then changes from the "0" logic level to the "1" logic level. This logical "1" signal is applied to the first input of an AND-gate 16, the second input of which receives a logical "1" signal from a flip-flop 17. The logical "1" signal delivered by the output of the AND-gate 16 passes through the OR-gate 14 in order to initiate continuous operation of the supply unit 11 and to permit (via access Bm) continuous operation of the modulating circuit of the transmitter-receiver unit 10. The signal having a "1" logic level at the output of the AND-gate 16 also serves as a call signal and is accordingly directed to the input E of the telephone set in order to initiate operation of the ringer. The flip-flop 17 receives the signal D and delivers a logical "0" signal having a duration of three seconds to the AND-gate 16 when the signal D undergoes a transition from the "1" logic level to the "0" logic level. Said flip-flop thus prohibits operation of the telephone-set ringer within the three-second interval following the instant at which the handset is replaced in its cradle.

If a user of station 1 lifts the handset when he or she hears the ringer of the telephone set 12, a conversation can be established between the user who has called station 2 and the called user of station 1. The "lifted-handset" signal D is at the "1" logic level throughout the duration of this conversation. As long as the handset of station 1 remains lifted, the signal D which is at level "1" and is applied to one of the inputs of the OR-gate 14 maintains continuous operation of the current supply and modulation of station 1.

When a conversation is completed between stations 1 and 2, the power-saving device is so designed as to resume periodic supply of the transxitter-receiver unit 10 only when both parties have hung-up, irrespective of the order in which they hang-up or replace the receiver, at least insofar as the party of station 2 does not hang-up more than three seconds after the party of station 1. This mode of operation is permitted by the flip-flop 17 since this latter is in fact triggered by the transition of its input signal from a "0" logic level to a "1" logic level. At this instant, said flip-flop delivers a pulse having a "0" logic level and a time-duration of three seconds. Thus, either the user of station 1 hangs-up last and the transition of signal D to the "0" level will accordingly produce intermittent supply of the transmitter-receiver unit 10 or else the user of station 1 hangs-up first and, if the user of station 2 hangs-up within the three-second interval which follows, the transition of the output signal of the AND-gate 16 will accordingly initiate intermittent operation of the supply unit 11. If the user of station 2 does not hang-up within the three seconds following the instant at which the handset of station 1 has been put down, the signals on the accesses Pm and Pp of the transmitter-receiver unit 10 remain at the "1" logic level since a modulated signal continues to be received. Thus the AND-gate 16 again delivers a "1" logic-level signal on completion of the output pulse of the flip-flop 17, with the result that the call bell or ringer of the telephone set 12 rings at the end of a three-second interval. A normal conversation may be resumed between the users of stations 1 and 2 on the assumption that, if the user of station 2 had not replaced the receiver, it was because he or she wished to converse with the user of station 1 and not because the user of station 2 had forgotten to hang-up.

Station 1 further comprises a timing circuit 18 which receives the signal indicating the presence of a carrier wave received from the access $P_p$ of the transmitter-receiver unit 10 and delivers an alarm signal if the received carrier-presence signal disappears and does not reappear within a predetermined time interval as defined hereinafter. The appearance of this alarm signal is considered as a signal representing a fault condition which prevents transmission by station 2 or reception by station 1. This signal provides a warning to the effect that a fault has appeared in the communication link and therefore also permits a saving of power consumption since it indicates that the unit 10 is being supplied with current to no purpose as long as the fault has not been repaired. In the example described, this signal serves to turn-on an illuminated legend or "FAULT" indicator (not illustrated in the drawings) which draws attention to the need for a repair.

The station 1 as described in the foregoing is capable of operating in a duplex connection with a station 2 which is of conventional type and thus has, for example, the same antenna, the same transmitter-receiver unit and the same telephone set as the station 1 but is not equipped with the power-saving device and in which the supply unit is designed for continuous operation.

The station 1 is also capable of operating in a duplex connection with a station 2 constructed in accordance with the same diagram as station 1. In this mode of operation which in any case corresponds to that of the example, it is necessary to prevent the timing circuit (circuit 20 in station 1) from producing an alarm signal during a standby period of the two stations. To this end, it must be ensured that the recurrence frequencies of the frequency generators (generator 13 in station 1) are not the same. The frequency generator which determines intermittent operation in the supply of power to station 2 has accordingly been chosen with a signal G2 whose representative curve as a function of the time t is given in FIG. 2. The signal G2 is a rectangular-wave signal which has a period T2 equal to 6.6 seconds and which remains at each period at the "1" logic level during a time interval t2=1.1 seconds and at the "0" logic level during a time interval T2 - t2=5.5 seconds.

Taking into account the periods of the signals G1 and G2 and the time intervals t1 and t2 (as shown in FIG. 2), the instants of simultaneous operation of the supply units of both stations have a recurrence frequency of 66 seconds. In order to check the correct performance of the connection made between stations 1 and 2, it is therefore only necessary to ensure that the timing circuit 18 of FIG. 1 has a period of 66 seconds. The same applies to the corresponding timing circuit (not shown) of station 2. In the example described, a safety margin has been adopted in the event of occurrence of a fault condition of very short duration. To this end, a period of three minutes has been chosen for the timing circuit of each of the two stations.

The present invention is not limited to the example hereinbefore described and is accordingly applicable to any type of intermittent supply of a transmitter-receiver which has to remain in the standby-watch state during time intervals of more or less long duration.

The invention also applies to the case of a group of subscribers or in other words a multiple station connected by means of a multiplexer-demultiplexer, via a radio link or a cable, to another group of subscribers or to a central exchange. The principle of operation remains the same as in the case described with reference to FIG. 1. It is only necessary for a person versed in the art to adapt the multiplexer-demultiplexer as a substitute for the telephone set 12 of FIG. 1. With this objective, the "hung-up" state will correspond in the case of one group to moments at which no subscriber of the group is connected to the line whereas the "lifted-handset" state will correspond to moments at which at least one of the subscribers of the group is connected to the line.

What is claimed is:

1. A transmitter-receiver station for a two-way communication link, comprising a transmitter-receiver unit, means for supplying current to said transmitter-receiver unit, a telephone handset to be lifted from a cradle in order to be put into service, a telephone set which is provided with a ringer and delivers a "lifted-handset" signal when said handset is removed from its cradle, a power-saving device comprising a frequency generator for producing pulses and a coupling circuit which has the function during a standby-watch state of the station of controlling the operation of the current supply means in dependence on the duration of the pulses and of permitting continuous operation of said current supply means throughout the duration of the lifted-handset signal, said coupling circuit being provided with a delay circuit for receiving the lifted-handset signal, for preventing operation of the ringer and for preventing continuous operation of the current supply means during a predetermined time interval after disappearance of said lifted-handset signal.

2. A station according to claim 1, wherein the coupling circuit comprises a gate having an output for controlling the current-supply means and the ringer and wherein the delay circuit has a time-delay of the order of three seconds and initiates opening of the gate during said time-delay.

3. A station according to claim 1, wherein the power-saving device comprises a fault detector for indicating an abnormal condition in a connection in which the station takes part, said detector being provided with an input for receiving from the transmitter-receiver unit a signal indicating reception of a carrier wave by the station and with an output for delivering a fault signal when the signal on its input disappears during a time interval which exceeds a predetermined value.

* * * * *